(12) United States Patent
Guzman et al.

(10) Patent No.: US 7,143,897 B1
(45) Date of Patent: Dec. 5, 2006

(54) WATER FILTER

(75) Inventors: Guillermo Guzman, Lighthouse Point, FL (US); Keith Worboys, Pompano Beach, FL (US)

(73) Assignee: H20 International, Inc., Deerfield Beach, FL (US)

( * ) Notice: Subject to any disclaimer, the term of this patent is extended or adjusted under 35 U.S.C. 154(b) by 294 days.

(21) Appl. No.: 10/731,820

(22) Filed: Dec. 9, 2003

(51) Int. Cl.
*B01D 35/00* (2006.01)
*B01D 27/00* (2006.01)
*B05B 1/14* (2006.01)
*B05B 15/08* (2006.01)

(52) U.S. Cl. .............. 210/460; 210/232; 210/449; 210/450; 210/459; 4/596; 239/587.1; 239/587.4

(58) Field of Classification Search ............ 210/232, 210/236, 238, 282, 287, 350, 435, 449, 459, 210/460, 461, 462; 4/286, 288, 299, 596, 4/615, 678; 239/553, 553.3, 553.5, 537, 239/538, 587.1, 587.4, 588
See application file for complete search history.

(56) References Cited

U.S. PATENT DOCUMENTS

| | | | |
|---|---|---|---|
| 4,190,207 A * | 2/1980 | Fienhold et al. ........... 239/381 |
| 5,653,548 A * | 8/1997 | Amdahl .................... 403/133 |
| 6,250,572 B1 | 6/2001 | Chen ........................ 239/602 |
| 6,325,930 B1 | 12/2001 | Farley ....................... 210/449 |
| 6,796,518 B1 * | 9/2004 | Douglas et al. ......... 239/587.4 |
| 6,951,286 B1 * | 10/2005 | Mueller et al. ............ 210/460 |
| 2003/0034405 A1 * | 2/2003 | Hsieh ........................ 239/553 |

* cited by examiner

*Primary Examiner*—John Kim
(74) *Attorney, Agent, or Firm*—Standley Law Group LLP

(57) ABSTRACT

A showerhead having a replaceable water filter assembly. The showerhead having a compact body with releasably coupled pivotable element connected to the water filter assembly.

11 Claims, 6 Drawing Sheets

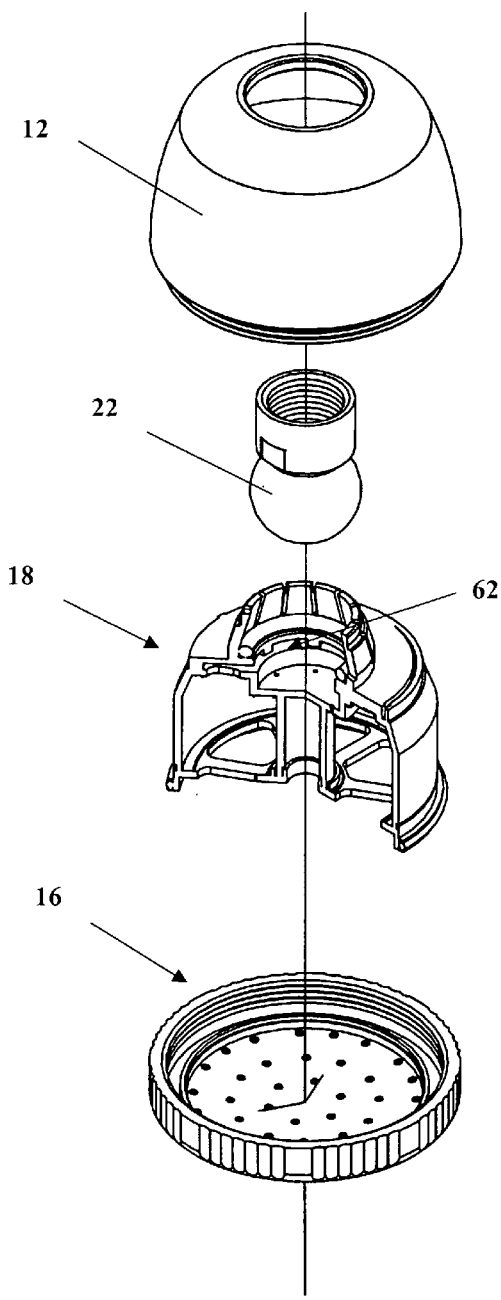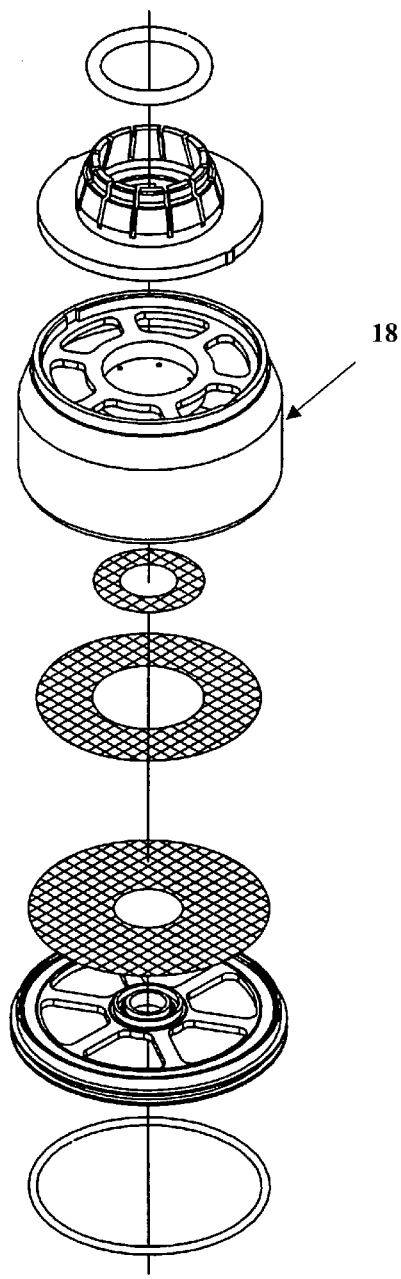
Figure 3A
Figure 3B

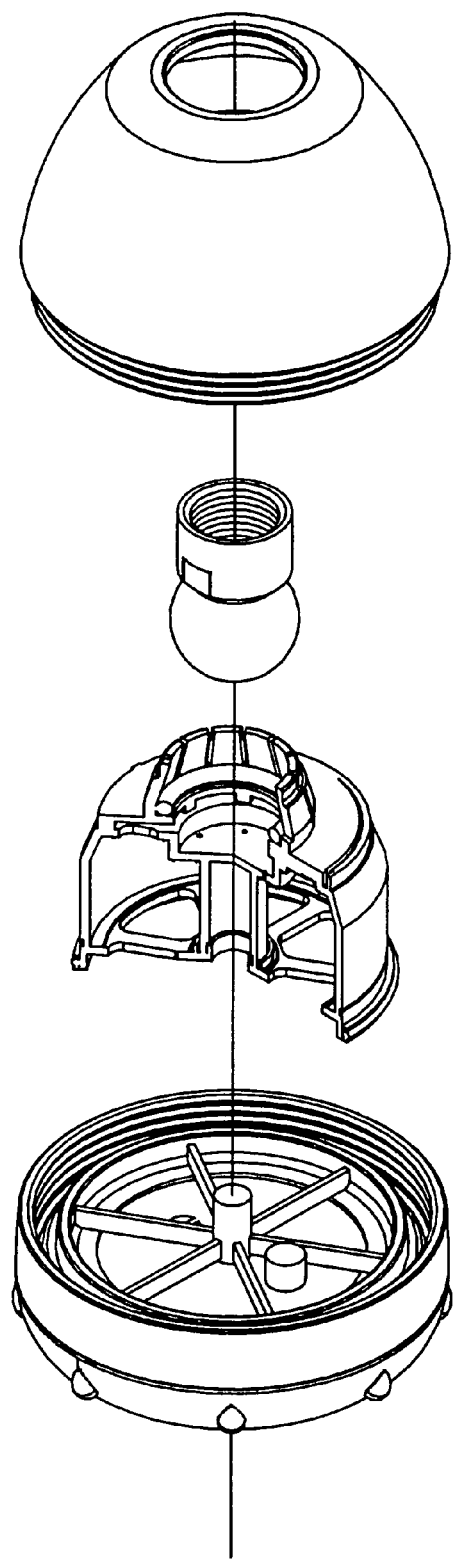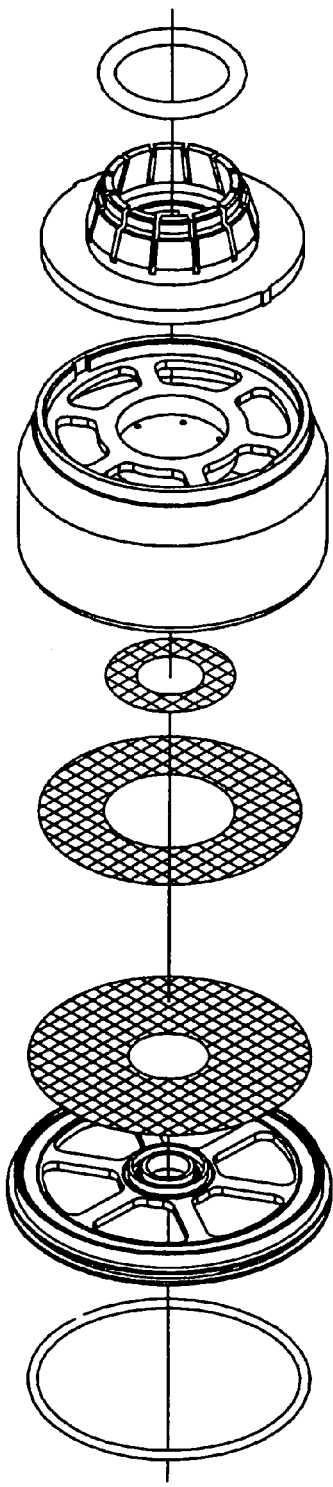
Figure 6A
Figure 6B

WATER FILTER

FIELD OF THE INVENTION

The present invention relates to the field of water filters.

BACKGROUND OF THE INVENTION

Water filters have become increasingly prevalent as consumers have become more health conscious. Typically, these water filters attach directly to the water faucet outlet and filter water as it flows out of the faucet. Generally, these water filters are comprised of replaceable filter cartridges that must be replaced after a certain period of time or use.

These water filters have also been applied to showerheads. For example, see U.S. Pat. No. 6,325,930 to Farley. In Farley, a filter cartridge is placed into two top and bottom hollow mating half body portions. The top mating half portion has a pivotable inlet for attaching to the water pipe. While the prior art teaches a showerhead having a water filter, the prior art requires the filter to be placed in two half body portions which increases the size and complexity of the showerhead. Furthermore, the prior art showerhead has a pivotable inlet that is integral to the top mating half portion that cannot be removed or replaced from the showerhead.

SUMMARY OF THE INVENTION

The present invention overcomes the shortcomings of the prior art by providing a showerhead having a replaceable water filter that is compact and has a pivotable inlet portion that is removably attached to the filter cartridge.

BRIEF DESCRIPTION OF THE DRAWINGS

The present invention relates to a water filter, comprising:

FIG. 3A illustrates another blown-up view of the shower filter of FIG. 1A;

FIG. 3B illustrates another blown-up view of the filter cartridge of FIG. 1A;

FIG. 6A illustrates a blown-up view of the shower filter of FIG. 5;

FIG. 6B illustrates a blown-up view of the filter cartridge of FIG. 5.

DETAILED DESCRIPTION OF THE PREFERRED EMBODIMENT

Figure 1A:
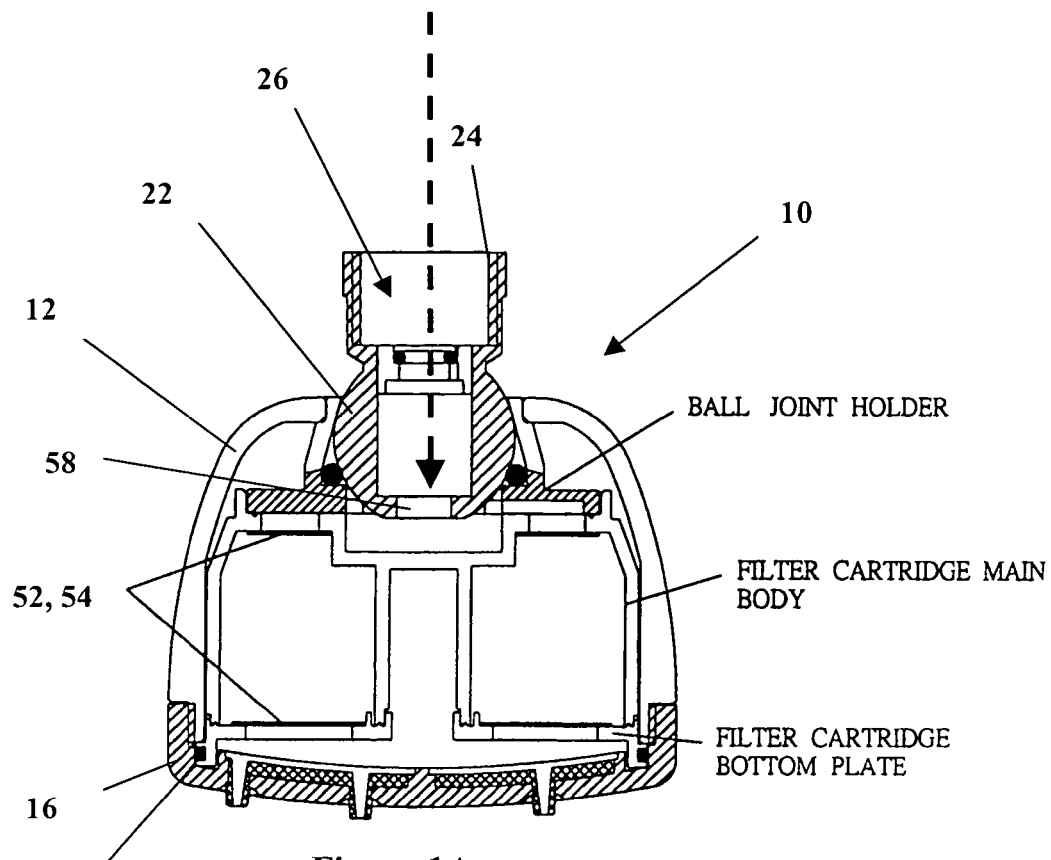
FIG. 1A illustrates a cross-sectional elevational view of one embodiment of the shower filter of the present invention.
Figure 1B:
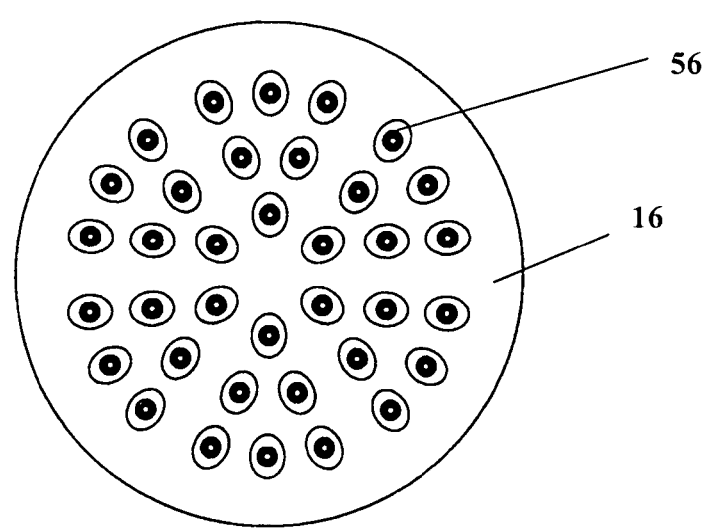
FIG. 1B illustrates a bottom plan view of the shower filter of FIG. 1A.

FIG. 1A illustrates a cross-sectional elevational view of one embodiment of the shower filter 10 of the present invention. FIG. 1B illustrates a bottom plan view of the shower filter of FIG. 1A. The shower filter of the present invention is preferably comprised of a body portion 12 having an opening 14; a face portion 16 releasably coupled to the body portion; and a water filter assembly 18 adapted to reside in the body portion. The water filter assembly is comprised of a recess 20 for accepting a pivotable element 22 operatively connected to a threaded inlet 24 (the pivotable element combined with the threaded inlet hereafter referred to as the "pivotable inlet") having an inlet passage 26 for accepting water from a connected water pipe or shower arm. The body portion and the face portion are adapted with matching threads 28 allowing them to be releasably coupled together to form a showerhead. The water filter assembly is housed in the body portion and is enclosed by the showerhead formed by the body portion and the face portion. In one embodiment, the body portion comprises about 80 percent of the axial length of the showerhead and the face portion comprises approximately 20 percent of the axial length of the showerhead.

Figures 2A, 2B:
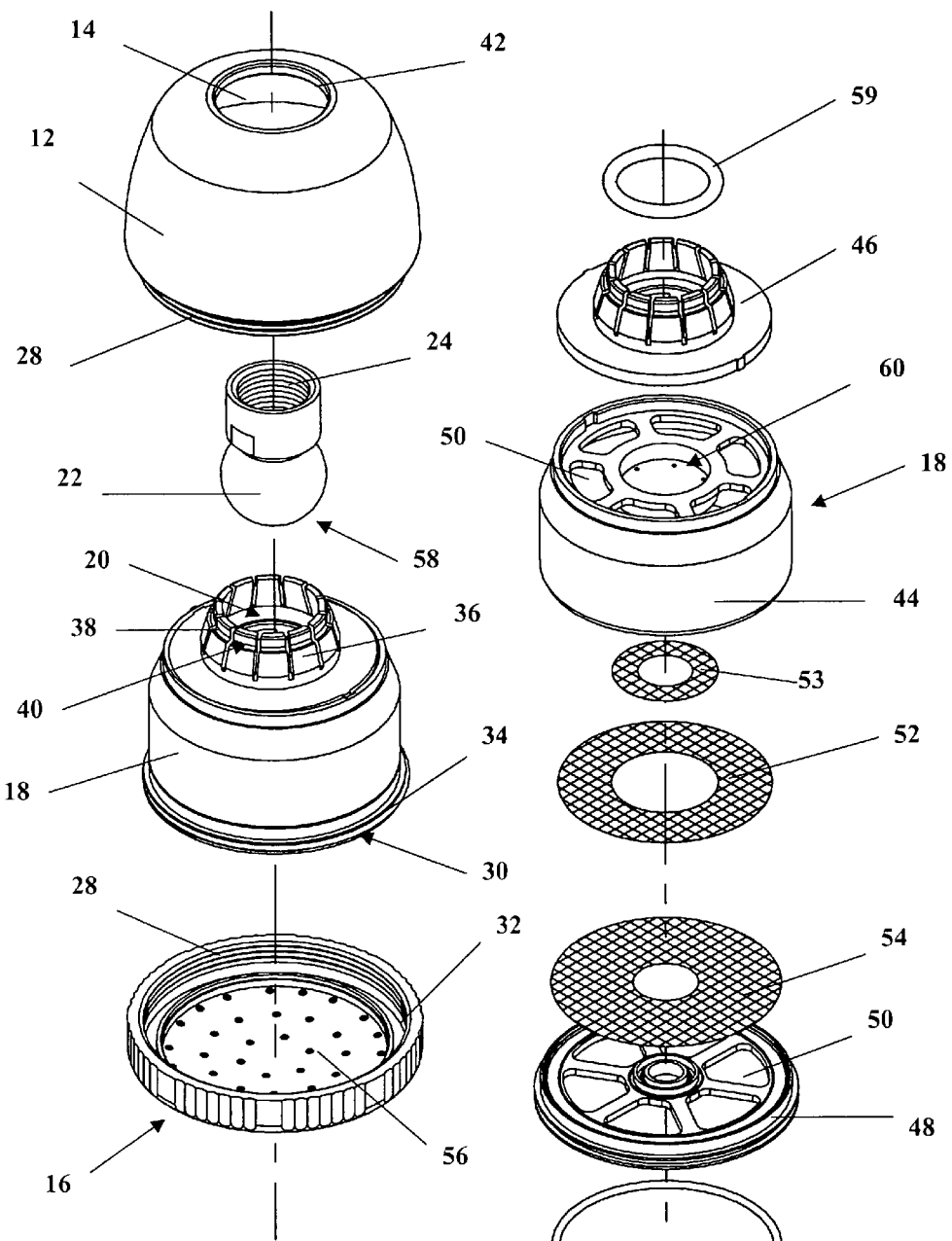
FIG. 2A illustrates a blown-up view of the shower filter of FIG. 1A.
FIG. 2B illustrates a blown-up view of the filter cartridge of FIG. 1A.

As illustrated in FIGS. 2A and 3A, the showerhead is assembled by:

first placing the pivotable inlet into the recess in the water filter assembly;

placing the water filter assembly into the body portion and guiding the threaded inlet of the pivotable element through the opening in the body portion;

connecting the body portion to the face portion by the matching threads thereby enclosing the water filter assembly in the body portion and the face portion.

In the preferred embodiment, the water filter assembly has a bottom annular flange 30 for releasably connecting to corresponding mating portion 32 of the face portion. In the preferred embodiment, the annular flange has a groove for placing a rubber sealing O ring 34.

It is also preferred that the recess in the water filter be formed from a plurality of flexible flanges or rib protrusions 36 arranged in an annular formation. In this embodiment, it is preferred that the pivotable element by a ball joint 22 that is releasably retained by the flexible flanges.

It is also preferred that the tips 38 of the flexible flanges be indented so as to form an annular indent portion 40. Upon assembly of the showerhead, the inner edge 42 of the opening in the body portion rests on the annular indent portion.

As illustrated in FIGS. 2B and 3B, the water filter assemby is comprised of a main water filter body 44 which is capped by the top 46 and bottom portions 48. The top and bottom portions of the water filter assembly have openings 50 for allowing water passage through the filter. The holes in the top and bottom portions of the water filter assembly are fitted with top and bottom screens or meshes 52 and 54 respectively, preferably made from thin metal, to allow water passage through the filter while retaining the filter elements inside the main water filter body.

Accordingly, upon attachment of the assembled showerhead filter onto the water pipe, the water flows through the pivotable element into the top of the water filter assembly and out the bottom of the water filter assembly and out of the holes 56 in the bottom face portion. The pivotable element has a bottom opening 58 for allowing water to exit the pivotable element into the water filter assembly. A recess sealing ring 59 is adapted to prevent water from leaving the top of the recess.

Figure 4A:
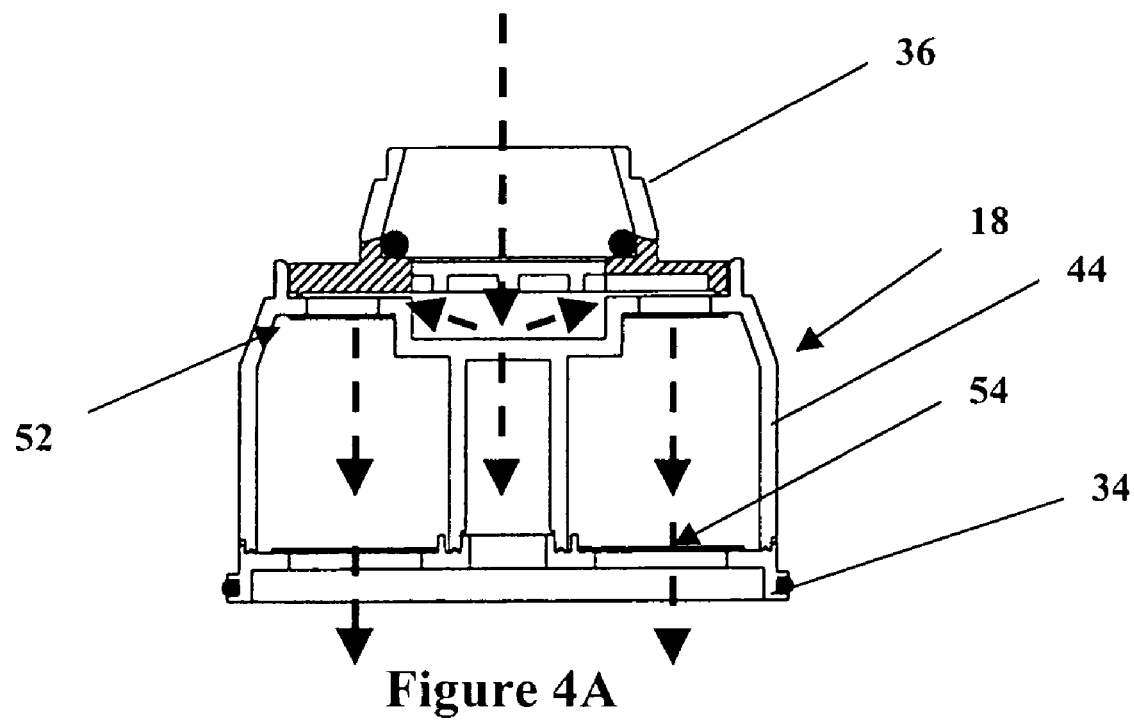
FIG. 4A illustrates a cross-sectional elevational view of one embodiment of the filter cartridge of the present invention.
Figure 4B:
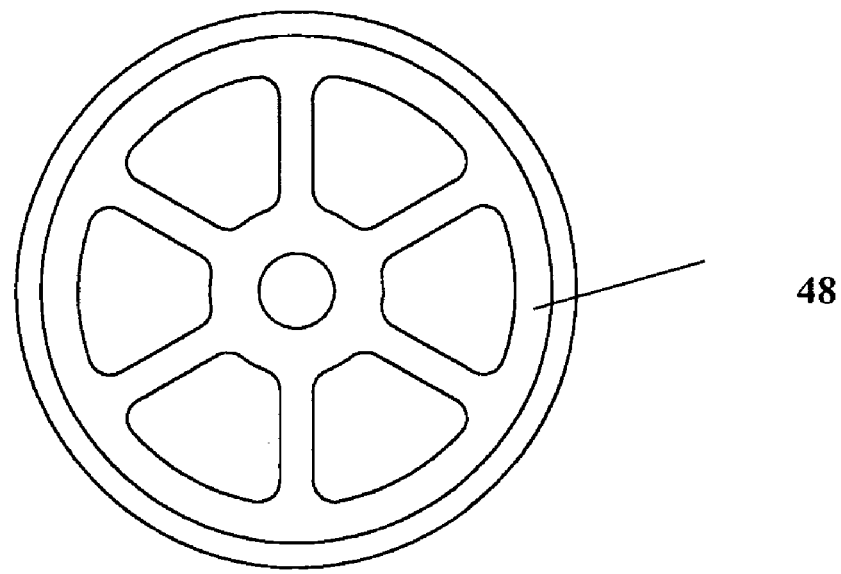
FIG. 4B illustrates a bottom plan view of one embodiment of the filter cartridge of the present invention.

The main filter body of the water filter assembly is preferably adapted with a plurality of smaller openings 60 in an area below the pivotable element for also accepting water into the water filter assembly. A metal screen 53 covers these smaller holes to prevent the filter media from leaving the filter. These smaller holes allow water to flow into the center of the water filter so as to make use of as much of the filter media as possible. The dotted arrows in FIGS. 1 and 4A illustrate the water flow through the pivotable element and the water filter assembly. As discussed, when water leaves the bottom of the pivotable element, some of the water enters the filter through the smaller holes under the pivotable element. The rest of the water enters the gaps 62 in the side walls of the recess and enters the filter through the larger holes in the filter assembly.

Figure 5:
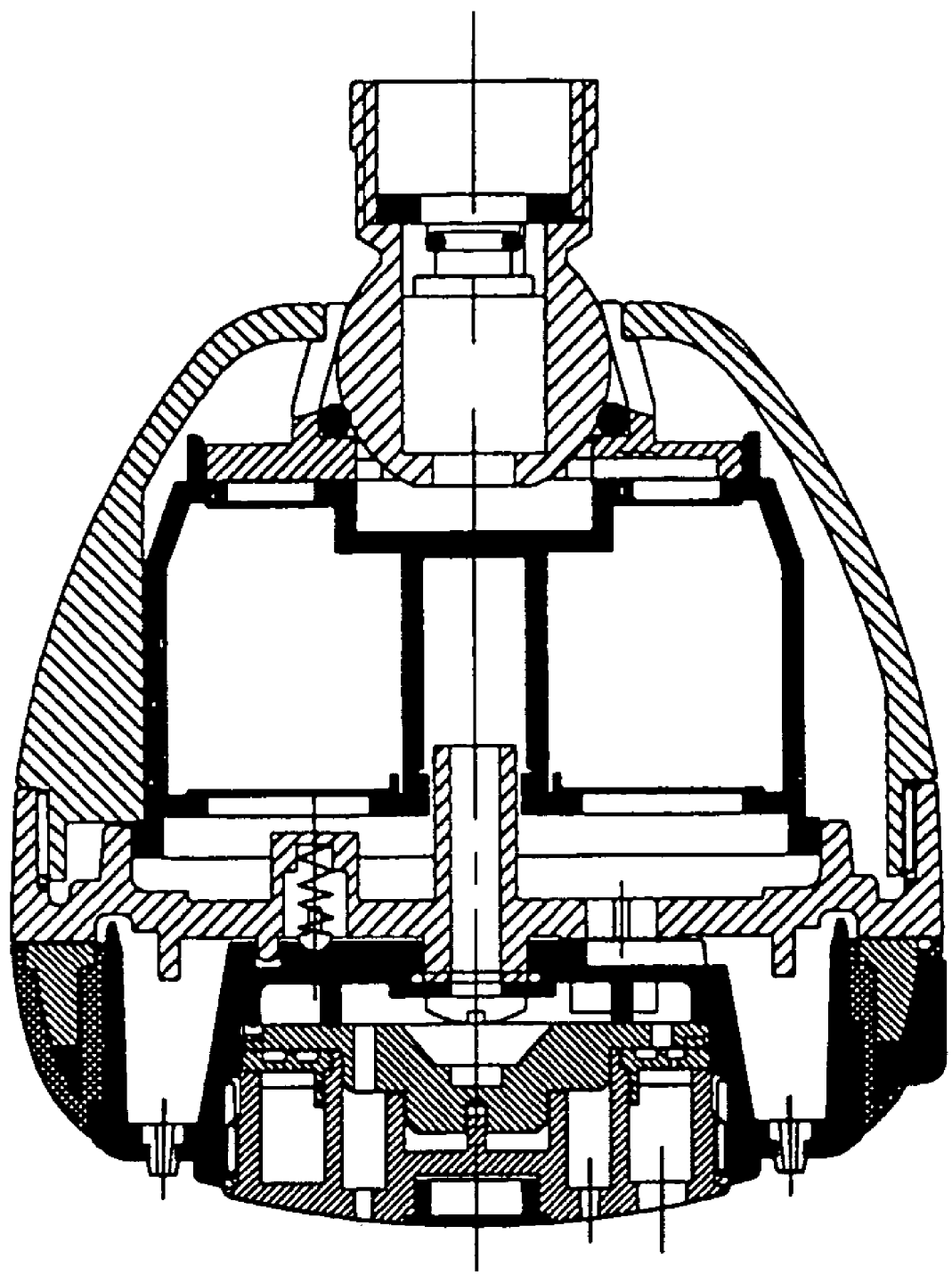
FIG. 5 illustrates a cross-sectional elevational view of another embodiment of the shower fiter of the present invention.

FIGS. 5 and 6A, 6B illustrate another embodiment of the showerhead filter of the present invention. FIG. 5 illustrates the principles of the present invention as applied to a five function showerhead. The functions of the showerhead include:

I. Massage;
II. Massage/Spray;
III. Fully Spray;
IV. Spray/Aeration (Bubble);
V. Aeration (Bubble).

In an alternate embodiment, a mist function could also be incorporated into the showerhead.

As discussed, the present invention relates to a showerhead having a compact structure having a releasably coupled pivotable inlet. The pivotable element is releasably connected to the replaceable filter cartridge. Having a releasable inlet allows the part to be removed and replaced with newer or differently configured or sized parts. Although the present invention has been described with regard to several embodiments, those embodiments are not to be construed as limiting the scope of the invention. Many embodiments of the invention will become apparent to those skilled in the art in light of the teachings of this specification. The only limitation of the scope of the invention are the claims appended hereto and equivalents thereof.

We claim:

1. A water filter, comprising:
   a body portion having an opening;
   a water filter cartridge adapted to reside in said body portion, wherein said water filter cartridge is disposable;
   a face portion, said face portion and body portion enclosing said water filter cartridge;
   a pivotable element, said pivotable element operatively connected to a threaded inlet, for accepting water, and wherein said water filter cartridge is comprised of a recess for accepting said pivotable element, wherein said recess is comprised of an opening formed in part by a plurality of flexible side portions and wherein said flexible side portions releasably retain said pivotable element to said water filter cartridge and wherein said threaded inlet is adapted to be attached to a water pipe so that said water filter cartridge is connected to the water pipe by said pivotable element and threaded inlet; wherein said threaded inlet is positioned outside said body portion when said water filter cartridge resides in said body portionand wherein said water filter cartridge is adapted with at least one opening for accepting water into said water filter cartridge, said pivotal element is comprised of at least one opening for allowing water to exit into said at least one opening in said water filter cartridge, said water filter cartridge is further comprised of an exit end having at least one opening for allowing water to exit said water filter cartridge, said face portion is comprised of a plurality of exit openings, said exit end of said water filter cartridge is releasably connected to said face portion and wherein said water exiting said exit end of said water filter cartridge flows out of said plurality of exit openings in said face portion.

2. A water filter according to claim 1, wherein said body portion and face portion are adapted with matching threads allowing said body portion and said face portion to be releasably coupled together to form a showerhead.

3. A water filter according to claim 1, wherein said recess is adapted with a sealing ring for preventing water leakage.

4. A water filter according to claim 1, wherein said water filter cartridge is disposable after removing said water filter cartridge from said body portion and after removing said pivotable element from said flexible side portions in said water filter cartridge.

5. A water filter according to claim 1, wherein said pivotable element is a ball joint.

6. A showerhead water filter, comprising:
   a body portion having an opening;
   a face portion releasably coupled to said body portion, wherein said face portion is comprised of a plurality of exit openings for passing water out of said water filter, and wherein said body portion and said face portion are coupled to form a showerhead;
   a water filter cartridge adapted to reside in said body portion, wherein said water filter cartridge is attached to a pivotable element, said pivotable element operatively connected to a threaded inlet, wherein said threaded inlet has an inlet passage for accepting water, and wherein said water filter cartridge is comprised of a recess formed from a plurality of flexible flanges arranged in an annular formation, wherein said flanges releasably retain said pivotable element to said water filter cartridge and wherein said threaded inlet is adapted to be attached to a water pipe so that said water filter cartridge is connected to the water pipe by said pivotable element and threaded inlet and wherein said water filter cartridge is adapted with at least one opening for accepting water into said water filter cartridge, said pivotal element is comprised of at least one opening for allowing water to exit into said at least one opening in said water filter cartridge, said water filter cartridge is further comprised of an exit end having at least one opening for allowing water to exit said water filter cartridge, said exit end of said water filter cartridge is releasably connected to said face portion and wherein said water exiting said exit end of said water filter cartridge flows out of said plurality of exit openings in said face portion.

7. A showerhead water filter according to claim 6, wherein said threaded inlet is positioned outside said body portion when said water filter cartridge resides in said body portion.

8. A showerhead water filter according to claim 6, wherein said water filter cartridge is held completely within said body portion.

9. A showerhead water filter according to claim 6 wherein said body portion comprises about 80 percent of the axial length of said showerhead and wherein said face portion comprises approximately 20 percent of the axial length of said showerhead.

10. A showerhead filter according to claim 6 wherein said water filter cartridge is comprised of a plurality of larger openings and smaller openings for allowing water passage through said water filter cartridge.

11. A showerhead filter according to claim 10, wherein said smaller openings are located below said pivotable element for allowing water to flow into a center portion of said water filter cartridge.

* * * * *

UNITED STATES PATENT AND TRADEMARK OFFICE
CERTIFICATE OF CORRECTION

| | | |
|---|---|---|
| PATENT NO. | : 7,143,897 B1 | Page 1 of 1 |
| APPLICATION NO. | : 10/731820 | |
| DATED | : December 5, 2006 | |
| INVENTOR(S) | : Guillermo Guzman and Keith Worboys | |

It is certified that error appears in the above-identified patent and that said Letters Patent is hereby corrected as shown below:

In column 3, line 58, please delete "portionand" and insert -- portion and --.

Signed and Sealed this

Twentieth Day of March, 2007

JON W. DUDAS
*Director of the United States Patent and Trademark Office*